(12) United States Patent
Krijn et al.

(10) Patent No.: US 12,535,343 B2
(45) Date of Patent: Jan. 27, 2026

(54) EXPERIMENTING WITH AN ADJUSTED GROW PROTOCOL TARGET VALUE

(71) Applicant: SIGNIFY HOLDING B.V., Eindhoven (NL)

(72) Inventors: Marcellinus Petrus Carolus Michael Krijn, Eindhoven (NL); Bartel Marinus Van De Sluis, Eindhoven (NL); Rob Franciscus Maria Van Elmpt, Roermond (NL); Thijs Van Den Bergh, Waalre (NL); Lambertus Antonius Johannes Van De Wijdeven, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 333 days.

(21) Appl. No.: 17/914,328

(22) PCT Filed: Mar. 18, 2021

(86) PCT No.: PCT/EP2021/056969
§ 371 (c)(1),
(2) Date: Sep. 24, 2022

(87) PCT Pub. No.: WO2021/191048
PCT Pub. Date: Sep. 30, 2021

(65) Prior Publication Data
US 2023/0125027 A1 Apr. 20, 2023

(30) Foreign Application Priority Data
Mar. 26, 2020 (EP) .................................... 20165908

(51) Int. Cl.
*G01D 21/00* (2006.01)
*H05B 47/105* (2020.01)

(52) U.S. Cl.
CPC ........... *G01D 21/00* (2013.01); *H05B 47/105* (2020.01)

(58) Field of Classification Search
CPC ...... G01D 21/00; H05B 47/105; Y02A 40/25; A01G 9/24; A01G 9/26; A01G 25/16;
(Continued)

(56) References Cited

U.S. PATENT DOCUMENTS 10,219,449 B2* 3/2019 Redden .................. A01M 21/04
10,709,073 B2* 7/2020 Millar ....................... A01G 9/24
(Continued)

FOREIGN PATENT DOCUMENTS

EP 3326452 A1 5/2018
JP 2010075172 A 4/2010
(Continued)

*Primary Examiner* — Christopher W Carter

(57) ABSTRACT

The invention concerns a method comprising selecting a grow protocol, selecting an identifier of a container (45), associating the grow protocol with the container identifier, and determining an adjusted target value by applying an adjustment to a target value specified in the growth protocol. The method further comprises controlling an environmental control system (11-13, 27) based on the adjusted target value, obtaining measurement information associated with the container identifier from a device (23), determining a measured plant growth parameter value based on the measurement information, and comparing the measured plant growth parameter value with an expected plant growth parameter value. The method also comprises determining a merit related to a difference between the values and replacing the target value with the adjusted target value and the expected plant growth parameter value with the measured plant growth parameter value in dependence on the merit exceeding a threshold.

20 Claims, 8 Drawing Sheets

(58) Field of Classification Search
CPC .... A01G 25/165; A01G 25/167; G06Q 50/02; G05B 2219/2625
See application file for complete search history.

(56) References Cited

U.S. PATENT DOCUMENTS

| | | | | |
|---|---|---|---|---|
| 10,897,856 | B2* | 1/2021 | Millar | A01G 9/247 |
| 11,723,327 | B2* | 8/2023 | Massey | A01G 31/047 |
| | | | | 47/60 |
| 12,026,803 | B2* | 7/2024 | Van De Sluis | G06T 7/0016 |
| 2010/0042234 | A1* | 2/2010 | May | A01G 7/00 |
| | | | | 47/17 |
| 2014/0258173 | A1* | 9/2014 | Blanchard | G06Q 10/067 |
| | | | | 705/348 |
| 2015/0027040 | A1 | 1/2015 | Redden | |
| 2015/0305258 | A1* | 10/2015 | Broutin Farah | A01G 31/02 |
| | | | | 700/90 |
| 2017/0332544 | A1 | 11/2017 | Conrad et al. | |
| 2018/0014486 | A1 | 1/2018 | Creechley et al. | |
| 2018/0146626 | A1 | 5/2018 | Xu | |
| 2018/0359955 | A1* | 12/2018 | Millar | A01G 9/24 |
| 2018/0359974 | A1* | 12/2018 | Millar | G01N 5/02 |
| 2019/0124855 | A1* | 5/2019 | Rowan | G06Q 50/02 |
| 2022/0309595 | A1* | 9/2022 | England | G06Q 10/06315 |
| 2023/0169640 | A1* | 6/2023 | Wake | A01G 7/00 |
| | | | | 382/110 |
| 2024/0040972 | A1* | 2/2024 | Krijn | A01G 9/26 |

FOREIGN PATENT DOCUMENTS

| | | |
|---|---|---|
| JP | 2017524349 A | 8/2017 |
| WO | 2016138075 A1 | 9/2016 |
| WO | 2018231336 A1 | 12/2018 |
| WO | 2018231370 A1 | 12/2018 |
| WO | 2019049048 A1 | 3/2019 |
| WO | 2019237200 A1 | 12/2019 |
| WO | 2020018802 A1 | 1/2020 |

* cited by examiner

EXPERIMENTING WITH AN ADJUSTED GROW PROTOCOL TARGET VALUE

CROSS-REFERENCE TO PRIOR APPLICATIONS

This application is the U.S. National Phase application under 35 U.S.C. § 371 of International Application No. PCT/EP2021/056969, filed on Mar. 18, 2021, which claims the benefit of European Patent Application No. 20165908.3, filed on Mar. 26, 2020. These applications are hereby incorporated by reference herein.

FIELD OF THE INVENTION

The invention relates to a method of controlling an environmental control system in a plant growing environment.

The invention further relates to a controller configured to perform such a method.

The invention also relates to a computer program product enabling a computer system to perform such a method.

BACKGROUND OF THE INVENTION

The world population is expected to grow from 6.5 billion now to 9 billion in 2050. Society is rapidly becoming predominantly urban. This will place major constraints on the availability of food and clean water. The space available for food production will become scarcer. Innovation in production methods is needed to deliver higher yields from less space, while becoming more sustainable (minimum use of energy and water).

Producing food in closed environments such as vertical farms is a method to meet these demands. Globally, large investments are being made in this method of growing food. In vertical farms, the production per unit of area is much higher than the production in the open field. The use of water is minimized. Plant diseases and pests can be prevented more easily.

In vertical farms (a.k.a. city farms or plant factories), food is grown in multiple layers, making much better use of the available space. This implies that daylight will not be able to reach the plants and nearly all the light must come from artificial lighting, consuming energy. A problem hampering full-scale adoption of vertical farming is the, as yet, limited return on investment. Setting up a vertical farm requires a large investment. The return on investment relies heavily on the operational efficiency of the farm. Typically, a crop is grown by following a so-called grow protocol (also referred to as grow recipe). A grow protocol prescribes the optimal target values for light, climate, irrigation and crop handling during the day and from day to day until the end of the growth period.

For a commercial vertical farm operation, this way of working has a drawback. The process of developing a grow protocol is in practice rather non-digital. It requires several time-consuming growth trials to find the optimal grow protocol. Since a grow protocol is specific for a crop variety, this has to be done for each of the many crop varieties that exist.

US 2018/0359955 A1 discloses a method for self-learning in a grow pod. A computing device stores logic that causes an assembly line grow pod to receive growth data from a sensor to determine the output of a plant and compare the output of the plant against an expected plant output. In some embodiments, the logic causes the assembly line grow pod to determine an alteration to a grow recipe to improve the output of the plant and alter the grow recipe for improving the output of the plant. For example, if the plant is deficient in an output measurement (such as height, girth, fruit output, water consumption, light consumption, etc.), a neural network may be utilized to change the recipe to correct that deficiency. Similarly, if the plant exceeds expectation for a particular measurement, the neural network may be utilized to determine the cause of the unexpected result and make changes to the recipe to reproduce the unexpected result.

A drawback of the method of US 2018/0359955 A1 is that it is not trivial to determine which alteration to make to a grow recipe based on a difference between the output of the plant and the expected plant output, which makes the use of this method complicated. A neural network needs to be trained before it can be used beneficially.

SUMMARY OF THE INVENTION

It is a first object of the invention to provide a method, which can be used to improve a grow protocol, and thereby improve the operational efficiency of a plant growing environment, in a relatively simple manner.

It is a second object of the invention to provide a controller which is able to improve a grow protocol, and thereby improve the operational efficiency of a plant growing environment, in a relatively simple manner.

In a first aspect of the invention, a method of controlling an environmental control system in a plant growing environment comprises selecting a grow protocol from a collection of grow protocols stored in a memory, selecting a container identifier identifying a container from a plurality of container identifiers, said container comprising at least one plant and said plurality of container identifiers being stored in said memory or in a further memory, associating said grow protocol with said container identifier, said grow protocol comprising one or more target values for one or more growth condition parameters, determining an adjusted target value by applying an adjustment to a target value of said one or more target values for a first growth condition parameter of said one or more growth condition parameters, said adjustment being larger than a predetermined minimum and smaller than a predetermined maximum, and controlling an environmental control system based on said adjusted target value.

The method further comprises obtaining measurement information associated with said container identifier from at least one device, determining a measured plant growth parameter value based on said measurement information, comparing said measured plant growth parameter value with an expected plant growth parameter value, said expected plant growth parameter value being included in said grow protocol, determining a merit related to a difference between said measured plant growth parameter value and said expected plant growth parameter value, replacing, in said grow protocol, said target value with said adjusted target value in dependence on said merit exceeding a threshold, and replacing, in said grow protocol, said expected plant growth parameter value with said measured plant growth parameter value in dependence on said merit exceeding said threshold. Said method may be performed by software running on a programmable device. This software may be provided as a computer program product.

Thus, an automated method is provided that enables gradual refinement of a grow protocol while growing the plant in a production environment, thereby gradually improving the operational efficiency. By doing so, the need to perform costly and time-consuming growth trials is (partly) obviated. Instead of trying to find which adjustment to a grow protocol would account for a difference between the output of a plant and the expected plant output, grow protocols are adjusted to see whether they will increase a merit, e.g. decrease a difference between the output of a plant and the expected plant output. Normally, while growing plants in a commercial setting, by following a (fixed) grow protocol, no new knowledge is generated that can be used to improve the grow protocol. With the provided automated method, continuous learning can be used to improve the grow protocol. This improves the return on investment for growers. Electricity usage may be monitored in order to optimize g/mol or g/kwh or profitability.

Said method may comprise obtaining said measurement information from said at least one device in or after a last growth stage of said grow protocol, for example. Alternatively, said method may comprise obtaining said measurement information from a plurality of devices and determining said measured plant growth parameter value in a plurality of growth stages based on said measurement information, for example.

Said target value of said first growth condition parameter may represent a light setting, said environmental control system may comprise a plurality of lighting devices, and said method may comprise selecting a lighting device associated with said container identifier from said plurality of lighting devices and controlling said lighting device based on said adjusted target value. This is beneficial if it is not possible to use the same light setting on all lighting devices, e.g. if different plant containers are associated with different grow protocols and need to be illuminated with different light settings. The associations between container identifiers and lighting devices may be manually configured or automatically determined. If multiple different lighting devices are able to illuminate the same container, then all of them or a (strict) subset of them may be selected. As an example of the latter, a plant container may need to be illuminated with another color and/or intensity than another plant container with another type of plants or with the same type of plants in another growth phase. In this case, a selection may be made based on capabilities of the lighting device such as a pre-harvest lighting device versus a seedling lighting device.

Said target value of said first growth condition parameter may represent a light setting, said environmental control system may comprise a plurality of lighting devices, and said method may comprises determining a current location of a container identifier, selecting said lighting device from said plurality of lighting devices by selecting a lighting device associated with said current location of said container identifier, and controlling said lighting device based on said adjusted target value. This "follow-me light source selection" allows the container to be automatically tracked, e.g. by using cameras or RFID tags, and the associated lighting device to be automatically selected.

Said method may comprise determining a crosstalk-free region of a container which corresponds to said container identifier, plants growing in said crosstalk-free region being free of light crosstalk, said crosstalk-free region being determined based on user input or based on distances between said plurality of lighting devices and plants growing in said container and/or on patterns of light emitted by said plurality of lighting devices, determining one or more plant identifiers which correspond to one or more plants growing in said crosstalk-free region of said container, and obtaining said measurement information associated with said container identifier by obtaining measurement information associated with said one or more plant identifiers. If one or more plants are illuminated by multiple lighting devices using different light settings, then this causes light crosstalk. If measurement information is obtained with respect to these one or more plants, it may not be possible to determine what the effect of the adjusted light setting was. It is therefore beneficial to obtain measurement information with respect to one or more plants in a crosstalk-free region.

Said method may comprise determining light characteristics of light received at the location of said container identifier from a further lighting device of said plurality of lighting devices, determining a compensated target value based on said adjusted target value and said light characteristics, and replacing, in said grow protocol, said target value with said compensated target value in dependence on said merit exceeding said threshold. If a further lighting device causes light crosstalk, it may still be possible to determine what the effect of the adjusted light setting was by compensating for the light crosstalk with the help of light characteristics of light received at the location of the container.

This is beneficial, for example, if it is not possible to obtain measurement information from one or more plants in a crosstalk-free region. However, this may also be beneficial if it is possible to obtain measurement information from one or more plants in a crosstalk-free region. For example, the measured grow results for a crosstalk region may be compared with grow results for neighboring non-crosstalk regions. If the grow results somewhere in the crosstalk region exceed those of the neighboring non-crosstalk regions, the adjusted light setting for that location in the crosstalk region may be stored in a new improved light protocol, which may be tested/verified on a next container. The light characteristics of the light received at the location of the container identifier may be measured, e.g. with a light sensor, or computed.

Said grow protocol may comprise target values for a plurality of growth condition parameters, said plurality of growth condition parameters may include said first growth condition parameter and one or more other growth condition parameters, and said method may comprise controlling said environmental control system or a further environmental control system based on one or more target values specified for said one or more other growth condition parameters without adjustment while controlling said environmental control system based on said adjusted target value for said first growth condition parameter. Typically, a grow protocol comprises target values for a plurality of growth condition parameters, e.g. light, temperature, humidity, and CO2 level. By only adjusting the target value of one of the growth condition parameters, it becomes easier to determine what further adjustment might have further benefit.

Apart from light crosstalk regions, there may be temperature (T), relative humidity (Rh) and/or CO2 "crosstalk" regions due to variations in T, Rh or CO2 along the direction of air flow. If a target value for a temperature, relative humidity, or CO2 growth condition parameter is adjusted, this "crosstalk" may be avoided or taken into account in a similar manner as described above with respect to light.

Said method may comprise associating said grow protocol with a further container identifier, determining a further adjusted target value by applying a further adjustment to a further target value of said one or more target values, said further adjustment being larger than said predetermined minimum and smaller than said predetermined maximum, controlling said environmental control system or a different environmental control system based on said further adjusted target value, obtaining further measurement information associated with said further container identifier from one or more devices, determining a further measured plant growth parameter value based on said further measurement information, comparing said further measured plant growth parameter value with said expected plant growth parameter value, determining a further merit of a difference between said further measured plant growth parameter value and said expected plant growth parameter value, replacing, in said grow protocol, said further target value with said further adjusted target value in dependence on said further merit exceeding said threshold, and replacing, in said grow protocol, said expected plant growth parameter value with said further measured plant growth parameter value in dependence on said further merit exceeding said threshold. Experiments with adjusted target values may be performed on multiple containers. Each time the merit of the adjustment exceeds the threshold (e.g. is higher than zero), the adjusted target value is deemed to have benefit and is stored in the grow protocol as new target value.

Said method may comprise associating said grow protocol with a further container identifier, determining a further adjusted target value by applying a further adjustment to a further target value of said one or more target values, said further adjustment being larger than said predetermined minimum and smaller than said predetermined maximum, controlling said environmental control system or a different environmental control system based on said further adjusted target value, obtaining further measurement information associated with said further container identifier from one or more devices, determining a further measured plant growth parameter value based on said further measurement information, comparing said further measured plant growth parameter value with said expected plant growth parameter value, determining a further merit of a difference between said further measured plant growth parameter value and said expected plant growth parameter value, comparing said merit with said further merit, replacing, in said grow protocol, said target value with said adjusted target value in dependence on said merit exceeding said threshold and said merit exceeding said further merit, and replacing, in said grow protocol, said expected plant growth parameter value with said measured plant growth parameter value in dependence on said merit exceeding said threshold and said merit exceeding said further merit. Experiments with adjusted target values may be performed on multiple containers at the same time. In this case, results from multiple experiments may be collected before the results are assessed. The adjusted targeted value with the highest merit is stored in the grow protocol as new target value.

Said method may comprise determining said adjusted target value based on a growth model of a plant species or variety associated with said grow protocol. In this case, said method may further comprise modifying said growth model based on a relation between said adjusted target value and said measured plant growth parameter value. A growth model may be used to understand plant growth better and to determine which adjustments to make to target values in a reasoned manner.

In a second aspect of the invention, a method controlling an environmental control system in a plant growing environment comprises selecting a grow protocol from a collection of grow protocols stored in a memory, selecting a plant identifier from a plurality of plant identifiers, said plurality of plant identifiers being stored in said memory or in a further memory, associating said grow protocol with said plant identifier, said grow protocol comprising one or more target values for one or more growth condition parameters, determining an adjusted target value by applying an adjustment to a target value of said one or more target values for a first growth condition parameter of said one or more growth condition parameters, said adjustment being larger than a predetermined minimum and smaller than a predetermined maximum, and controlling an environmental control system based on said adjusted target value.

Said method further comprises obtaining measurement information associated with said plant identifier from at least one device, determining a measured plant growth parameter value based on said measurement information, comparing said measured plant growth parameter value with an expected plant growth parameter value, said expected plant growth parameter value being included in said grow protocol, determining a merit related to a difference between said measured plant growth parameter value and said expected plant growth parameter value, replacing, in said grow protocol, said target value with said adjusted target value in dependence on said merit exceeding a threshold; and replacing, in said grow protocol, said expected plant growth parameter value with said measured plant growth parameter value in dependence on said merit exceeding said threshold. Said method may be performed by software running on a programmable device. This software may be provided as a computer program product.

In a third aspect of the invention, a controller comprising at least one sensor interface for obtaining measurement information from at least one device, at least one control interface for controlling an environmental control system, and at least one processor adapted to execute the steps of any one of the methods described above.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations that comprise selecting a grow protocol from a collection of grow protocols stored in a memory, selecting a container identifier identifying a container from a plurality of container identifiers, said container comprising at least one plant and said plurality of container identifiers being stored in said memory or in a further memory, associating said grow protocol with said container identifier, said grow protocol comprising one or more target values for one or more growth condition parameters, determining an adjusted target value by applying an adjustment to a target value of said one or more target values for a first growth condition parameter of said one or more growth condition parameters, said adjustment being larger than a predetermined minimum and smaller than a predetermined maximum, and controlling an environmental control system based on said adjusted target value.

The executable operations further comprise obtaining measurement information associated with said container identifier from at least one device, determining a measured plant growth parameter value based on said measurement information, comparing said measured plant growth parameter value with an expected plant growth parameter value, said expected plant growth parameter value being included in said grow protocol, determining a merit related to a difference between said measured plant growth parameter value and said expected plant growth parameter value, replacing, in said grow protocol, said target value with said adjusted target value in dependence on said merit exceeding a threshold, and replacing, in said grow protocol, said expected plant growth parameter value with said measured plant growth parameter value in dependence on said merit exceeding said threshold. Said method may be performed by software running on a programmable device. This software may be provided as a computer program product.

A non-transitory computer-readable storage medium stores at least a second software code portion, the second software code portion, when executed or processed by a computer, being configured to perform executable operations that comprise selecting a grow protocol from a collection of grow protocols stored in a memory, selecting a plant identifier from a plurality of plant identifiers, said plurality of plant identifiers being stored in said memory or in a further memory, associating said grow protocol with said plant identifier, said grow protocol comprising one or more target values for one or more growth condition parameters, determining an adjusted target value by applying an adjustment to a target value of said one or more target values for a first growth condition parameter of said one or more growth condition parameters, said adjustment being larger than a predetermined minimum and smaller than a predetermined maximum, and controlling an environmental control system based on said adjusted target value.

The executable operations further comprise obtaining measurement information associated with said plant identifier from at least one device, determining a measured plant growth parameter value based on said measurement information, comparing said measured plant growth parameter value with an expected plant growth parameter value, said expected plant growth parameter value being included in said grow protocol, determining a merit related to a difference between said measured plant growth parameter value and said expected plant growth parameter value, replacing, in said grow protocol, said target value with said adjusted target value in dependence on said merit exceeding a threshold; and replacing, in said grow protocol, said expected plant growth parameter value with said measured plant growth parameter value in dependence on said merit exceeding said threshold.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
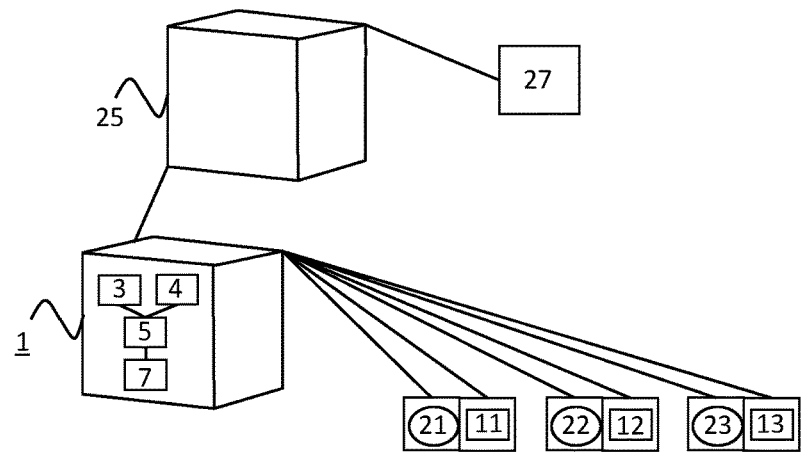
FIG. 1 is a block diagram of a first embodiment of the system.

FIG. 1 shows a first embodiment of the controller for controlling an environmental control system in a plant growing environment: a light control computer 1. The plant growing environment may be a vertical farm, for example. In the example of FIG. 1, the light conditions (light intensity, spectrum, and their dependence on the time of day and growth stage of the plant) are controlled by the light control computer 1 and the climate conditions (temperature, humidity, CO2 level) are controlled by a climate control computer 25. The light conditions are typically specified in a light protocol/light recipe and the climate conditions are typically specified in a climate protocol/recipe. The light protocol and climate protocol are part of a grow protocol.

The light computer 1 controls lighting devices 11-13, e.g. LED modules. The lighting devices 11-13 may be, for example, top-lighting devices or inter-lighting devices, which typically hang between plants, or part thereof. The climate computer 25 controls a Heating, Ventilation and Air Conditioning (HVAC) system 27. Optionally, the climate control computer 25 may receive sensor data from one or more climate sensors (not shown), e.g. including a temperature sensor and/or a CO2 sensor, and control the HVAC system 27 based on this sensor data.

The light control computer 1 comprises a receiver 3, a transmitter 4, a processor 5, and memory 7. The processor 5 is configured to select a grow protocol from a collection of grow protocols stored in memory 7, select a container identifier identifying a container (which comprises at least one plant) from a plurality of container identifiers or a plant identifier from a plurality of plant identifiers, and associate the grow protocol with the container or plant identifier. In an alternative embodiment, the collection of grow protocols is stored on an Internet server (not shown in FIG. 1).

In the example of FIG. 1, the grow protocol contains target values for a plurality of growth condition parameters. These plurality of growth condition parameters including a first growth condition parameter and one or more other growth condition parameters. The target value of the first growth condition parameter represents a light setting. The grow protocol further comprises one or more other target values for temperature, CO2 level and/or humidity. The plurality of container or plant identifiers is stored in the memory 7.

The processor 5 is further configured to determine an adjusted target value by applying an adjustment to a first target value of the one or more target values for the first growth condition parameter of the one or more growth condition parameters and control, via the transmitter 4, at least one of the lighting devices 11-13 based on the adjusted target value and the climate control computer 25, and thereby the HVAC system 27, based on one or more other target values specified for the one or more other growth condition parameters. The one or more other target values are not adjusted.

The adjustment to the first target value is larger than a predetermined minimum and smaller than a predetermined maximum. Although the adjustment may be randomly selected within these boundaries, preferably, an adjusted target value is determined that slightly deviates from the target value specified in the stored grow protocol and that is expected to achieve a merit closer to a desired merit (e.g. maximum production), which is therefore higher than the merit of the target value specified in the stored grow protocol.

The processor 5 is further configured to obtain, via the receiver 3, measurement information associated with the container or plant identifier from at least one of sensor devices 21-23, determine a measured plant growth parameter value based on the measurement information and compare the measured plant growth parameter value with an expected plant growth parameter value. The expected plant growth parameter value is included in the grow protocol and is typically a previously determined measured growth parameter that was determined based on previously obtained measurement information in relation to the target values currently specified in the grow protocol.

In the example of FIG. 1, the measurement information is obtained from at least one sensor device. In an alternative embodiment, the measurement information is obtained from a user device, e.g. a mobile device or tablet, on which a user has manually entered the measurement information. While light may be controlled per container (and a container typically contains multiple plants of the same type), climate can normally not be controlled per container but only per larger spatial area, e.g. per growth level. On the other hand, the measurement information may be obtained per plant or plurality of plants.

For statistical reasons, obtaining measurement information for a plurality of plants is preferred over obtaining measurement information for a single plant. This may be achieved by selecting a container identifier and obtaining measurement information with respect to a plurality of plants in the identified container (typically of the order of at least 10-100 plants; for light, the smaller the adjustment in a color component or intensity is, the more plants are needed to establish a statistically significant effect). This may also be achieved by selecting multiple plant identifiers, using the same adjusted target value on the selected plants, obtain measurement information with respect to the selected plants and determining an average measured plant growth parameter value or an average merit.

The processor 5 is further configured to determine a merit related to a difference between the measured plant growth parameter value and the expected plant growth parameter value, replace, in the grow protocol, the target value with the adjusted target value in dependence on the merit exceeding a threshold, and replacing, in the grow protocol, the expected plant growth parameter value with the measured plant growth parameter value in dependence on the merit exceeding the threshold. This merit is also referred to as the merit of the adjustment.

The processor 5 may be configured to determine the merit of the adjustment by using a merit function. The merit function defines a merit per set of input parameter values. This parameter to be optimized is plant growth or depends on plant growth. A grower may be able to select an objective, e.g. maximize the weight of the plants, maximize growth efficiency or maximize profit, which causes a corresponding merit function to be selected. Typically, the growth efficiency is expressed as the biomass produced per unit of energy consumed (e.g. in units of g/kWh). If the grower selects maximizing growth efficient as objective, the merit function equals the growth efficiency and the input parameters are biomass and consumed energy. If the grower selects maximizing the weight of the plants as objective, the merit function equals the plant growth and the input parameter is biomass.

With at least one of the containers, a grow protocol is associated that deviates slightly from the grow protocol stored in the collection of grow protocols. It is beneficial to determine the adjustments to be made by using a self-learning algorithm. Initial adjustments may be randomly chosen, while in a later stage, adjustments may be determined based on earlier adjustments which proved to successfully contribute to the formulated objective.

The self-learning may be activated or adjusted based on an external (user) input. For instance, a grower may have the possibility to indicate for which grow protocol or farm segment he/she wants to activate the self-learning. The grower may also be able to indicate to which growth parameters adjustments are allowed or prohibited. The light control computer 1 may also have access to external knowledge sources that make it possible to determine which growth parameters or growth parameter adjustments are likely to improve the merit. These external knowledge sources may be external reports from scientific studies or data shared by other farm systems, for example.

The algorithm may also take available historical data into account (e.g. the results of grow protocols executed in the past and their outcome, including adjustments to target values and actual grow conditions). Besides crop-related properties such as crop size, appearance or quality, the merit function may include external factors such as (e.g. measured) electricity usage and historical, actual, and anticipated energy prizes and crop prizes.

After the measured plant growth parameter value is determined, a first merit corresponding to the measured plant growth parameter value or to a set of input parameters that comprises the measured plant growth parameter value (and further comprises a measured energy consumption parameter, for example) is obtained by using the merit function. Next, a second merit corresponding to the expected plant growth parameter value or to a set of input parameters that comprises the measured plant growth parameter value is determined. This second merit may have previously been stored.

The adjustment merit is equal to the difference between the first and second merits. If this adjustment merit exceeds the threshold, then the adjustment made to the grow protocol is deemed beneficial and the adjustment also made to the grow protocol stored in the collection of grow protocols. If the threshold is zero, than any improvement to the merit will result in the adjustment also being made to the grow protocol stored in the collection of grow protocols.

With above-described controller, it becomes possible to optimize aspects of a light protocol such as the spectral composition of the light. For example, the ratio of blue light and red light may be optimized while taking the Photosynthetic Photon Flux Density (PPFD) to be constant.

Similarly, the PPFD may be optimized. In general, the higher the PPFD, the higher the growth rate and the higher the income from the sales of the harvested plants. However, typically the growth efficiency will suffer (i.e. the g/kWh value will reduce).

By also including the sales price of harvested plants ($/kg) and the energy price ($/kWh) in the input parameters, it is possible to define a merit function that has a maximum that corresponds to a maximum in the profit generated from the vertical farm operation. With the above-described controller, it becomes possible to optimize a light protocol to achieve such a maximum profit.

Thus, the above-described controller can be used to improve a grow protocol by strategically adjusting the nominal grow protocol and analyzing the result. The adjustments should preferably be large enough to be able to detect a response with sufficient accuracy (in a statistical sense). The adjustments should preferably be small enough in order not to affect the plant growth too much to not jeopardize the operation of the plant growing environment.

The controller may also match the adjustment size to the sample size (e.g. number of plant containers involved) or vice versa. As an example of the latter, the number of plants (e.g. plant containers) on which the adjusted target value is tested may be increased when the obtained accuracy is too low with the desired (large) adjustment size. In the case that the controller has seen positive results of subsequent parameter value adjustments (e.g. light setting adjustments), the controller may decide to make a larger parameter value adjustment while applying this to one or two plant containers only. With this way of working, the risk of significant impact on the production is kept minimal. The controller may also decide to make larger adjustments in a part of a plant growing environment, e.g. of a vertical farm, that has extensive sensing equipment. This enables timely re-adjustment if the deviation turns out to negatively impact the plants.

Objectives of a grower that may be beneficially used with the above-mentioned controller include the following: maximum growth efficiency, maximum profit, just-in-time production, optimum growth uniformity, optimum coloration, optimum shelf life, optimum compound concentration (e.g. vitamin C), and optimum adherence to contracts with customers. Another example of an objective is reproducibility. A target value that maximizes one of the above objectives, e.g. maximum growth efficiency, but is so aggressive that the result becomes too critically dependent on the system's reliability, e.g. use of this target value only rarely maximizes the objective, is normally not desirable.

The self-learning algorithm may be based on machine-learning techniques such as reinforcement learning as well as on classical techniques that iteratively search for the maximum of a merit. For example, a classical method to find a global maximum (or minimum) is the well-known method of simulated annealing. A classical method to find a nearest local maximum (or minimum) is the well-known gradient descent method.

In the embodiment of the computer 1 shown in FIG. 1, the computer 1 comprises one processor 5. In an alternative embodiment, the computer 1 comprises multiple processors. The processor 5 may be a general-purpose processor, e.g. from Intel or AMD, or an application-specific processor. The processor 5 may run a Windows or Unix-based operating system for example. The memory 7 may comprise one or more memory units. The memory 7 may comprise one or more hard disks and/or solid-state memory, for example. The memory 7 may be used to store an operating system, applications and application data, for example.

The receiver 3 and the transmitter 4 may use one or more wired and/or wireless communication technologies to communicate with the lighting devices 11-13 and the sensor devices 21-23, for example. In an alternative embodiment, multiple receivers and/or multiple transmitters are used in computer 1 instead of a single receiver and a single transmitter. In the embodiment shown in FIG. 1, separate receivers and separate transmitters are used. In an alternative embodiment, the receiver 3 and the transmitter 4 are combined into a transceiver. The computer 1 may comprise other components typical for a computer such as a power connector and a display. The invention may be implemented using a computer program running on one or more processors.

In the embodiment of FIG. 1, the system of the invention is a computer. In an alternative embodiment, the system of the invention is a different device. In the embodiment of FIG. 1, the system of the invention comprises a single device. In an alternative embodiment, the system of the invention comprises a plurality of devices. In the embodiment of FIG. 1, the computer 1 uses a transmitter to control the lighting devices. In an alternative embodiment, the computer 1 uses only analog wires to control the lighting devices.

Figure 2:
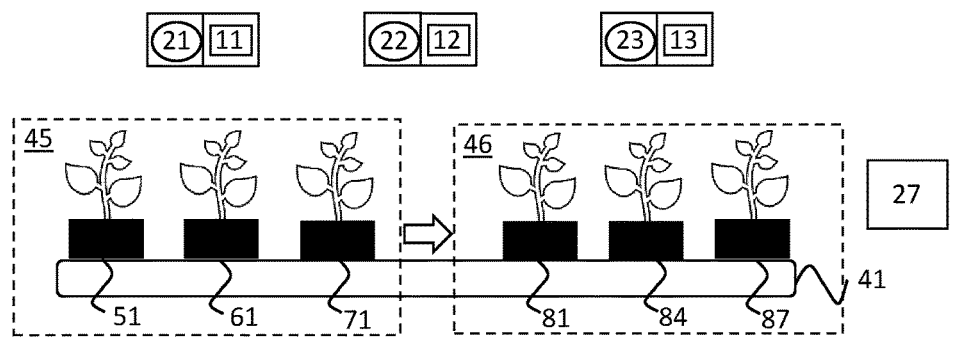
FIG. 2 schematically depicts an example of a plant growing environment in which the system may be used.

FIG. 2 depicts an example of a plant growing environment in which the system of FIG. 1 may be used. In the example of FIG. 2, a first container 45 and a second container 46 are moving on a conveyer belt 41.

The conveyor belt 41 may be part of a layer of a growth rack that has multiple layers for growing plants, for example. In this case, containers with young plants are inserted at one end of the layer. While being pushed through the layer from begin to end, the plants receive a light treatment and experience a climate in accordance with a grow protocol. At the end of the layer, the containers with plants may be taken out of the layer to be harvested (or respaced or relocated for another treatment). This is typical for a so-called first-in-first-out (FIFO) logistics system.

Alternatively, containers with young plants are inserted at one end of the layer while the containers with plants ready to harvest are extracted at the same end (a so-called last-in-first-out (LIFO) logistics system).

A first subset of the lighting devices 11-13 is controlled to illuminate the first container 45 according to a light setting associated with this first container 45. A second subset of the lighting devices 11-13 is controlled to illuminate the second container 46 according to a light setting associated with this second container 46. The lighting devices 11-13 may be LED lighting modules, for example.

Each of the lighting devices typically uses a light setting specified in the grow protocol associated with the container that is nearest. When another container with another associated grow protocol becomes the nearest container, the lighting device will start using a different light setting. Thus, a light protocol associated with a container follows the container throughout its journey from begin to end of the growth layer. Every time a container moves to a new location, the lighting elements at the new location will be controlled to emit light according to the light protocol associated with that container.

In general, the grow protocol associated with a container follows the container throughout its movement from begin to end of the growth layer started. However, in practice, in most cases, the climate cannot be changed within a growth layer without affecting the climate for the other growth layers in the climate cell as well. In such a case, the climate protocol may be associated with all containers in a climate cell.

In order to find the optimal grow protocol, the lighting devices will deviate slightly from the light settings specified in the grow protocol with respect to a selected container. In other words, the adjusted target value follows the logistical movement of the container.

In general, the system may keep track of plant containers by determining all logistic movements (e.g. by having cameras monitor a continuous linear process or by deriving the logistics movements from information provided by a logistics system) or by detecting the position of each plant container (e.g. each plant container may be equipped with an identification tag, which may be a visual identifier such as a QR code. or an RF-identifier such an NFC or RFID tag).

By determining a measured plant growth parameter value, the success of the adjustment may be evaluated. Periodically (i.e. at least one time, such as at harvest time), properties (e.g. the weight) of the selection of plants are measured to determine the merit of the adjustment. Plant-related measurements may be stored along with the corresponding plant identifier(s) and applied grow protocol.

It is often sufficient to obtain the measurement information from a sensor device in or after a last growth stage of the grow protocol. For example, if plant 87 would be in its last growth stage, it might be sufficient to obtain the measurement information only from sensor device 23. However, the measurement information may also be obtained from each of the sensor devices 21-23 and the the measured plant growth parameter value may be determined in a plurality of growth stages based on the measurement information.

In the latter case, the merit of the adjustment may not (just) be determined at the end of the growth cycle when a container with plants is extracted from the growth layer, but (also) at intermediate times. For this, sensor devices may be used that are distributed along a growth layer. The sensor devices can either have a fixed position or move along the growth layer (e.g. move in synchronicity with the movement of the containers). In the example of FIG. 2, the sensor devices 21-23 are cameras distributed across the growth layer to detect a plant property relevant for determining the merit of the adjustment.

In the case that the objective is to maximize the weight of the plants, the weight is measured either continuously, frequently or finally, at the time of harvest. Based on this measurement, the value of the merit function is determined. Based on this value, a (self-learning) algorithm may suggest a (further) adjustment to the grow protocol associated with this container. Adjustments to a grow protocol may be applied intra-day, from day to day, or from week to week, while the container resides in the growth layer.

One way of continuously measuring the weight, albeit in an indirect manner, would be by processing images captured by (3D) cameras to determine the plant coverage or volume (using height information derived from the camera images) and use this as an indication of the generated biomass (e.g. via correlating the plant coverage or volume with biomass with data).

A camera does not necessarily need to be able to identify individual plants. Typically, mature plants might overlap in such a manner that individual plants are no longer identifiable. Still, a camera may be used to determine properties of the "green mass" in the field of view and break this down to an average plant property when knowing the plant density (the number of plants per square meter). Although less practical, if it is desirable to determine a weight per plant, individual plants may be provided with a plant identifier (e.g. in case the plants are potted plants, a QR code on each pot).

Crosstalk (e.g. of the lighting) between adjacent selections of plants (experiencing a different applied grow protocol) may be accounted for, e.g. by not considering measurement information of the plants in the crosstalk region. The measured properties and the applied grow protocol may be given to the algorithm to suggest a next deviation from the grow protocol, with the aim to optimize the merit.

Figure 3:
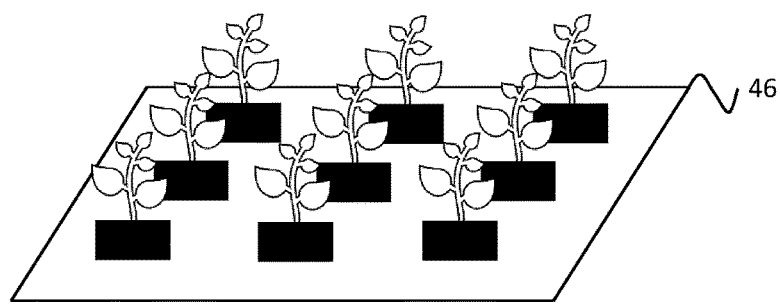
FIG. 3 shows a side view of one of the containers depicted in FIG. 2.

In the example of FIG. 2, the sensor devices 21-23 comprise cameras. Alternatively or additionally, the sensor devices 21-23 may comprise scales. In the example of FIG. 2, each container comprises multiple plants. Typically, more plants are conveyed over the conveyor belt 41 than depicted in FIG. 2. For example, as shown in FIG. 3, the container 46 may comprise three rows of three plants of which only the front row is depicted in FIG. 2.

Figure 4:
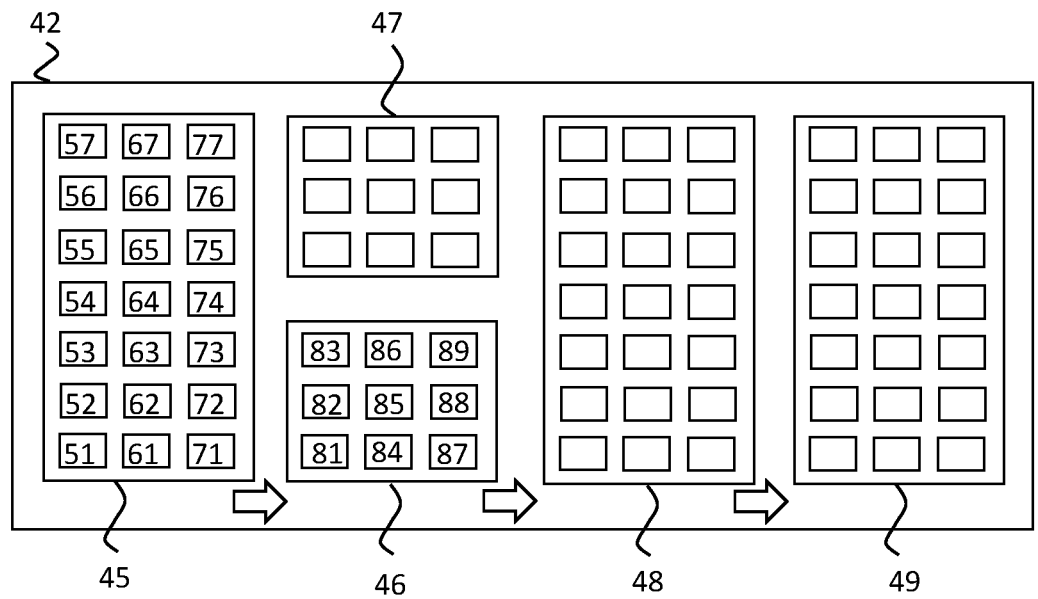
FIG. 4 schematically depicts a top view of the containers depicted in FIG. 2.

FIG. 4 schematically depicts a top view of the containers depicted in FIG. 2. Containers 45-49 are moving on a conveyer belt 42. Container 45 contains plants 51-77 and container 46 contains plants 81-89. Each plant may have been assigned a plant identifier. To avoid the effect of light crosstalk, only the measurement information associated with plants 63-65 may be obtained, for example. While it is typically not possible to use different light settings for different plants of the same container, it is normally possible to obtain different measurement information for different plants of the same container.

Figure 5:
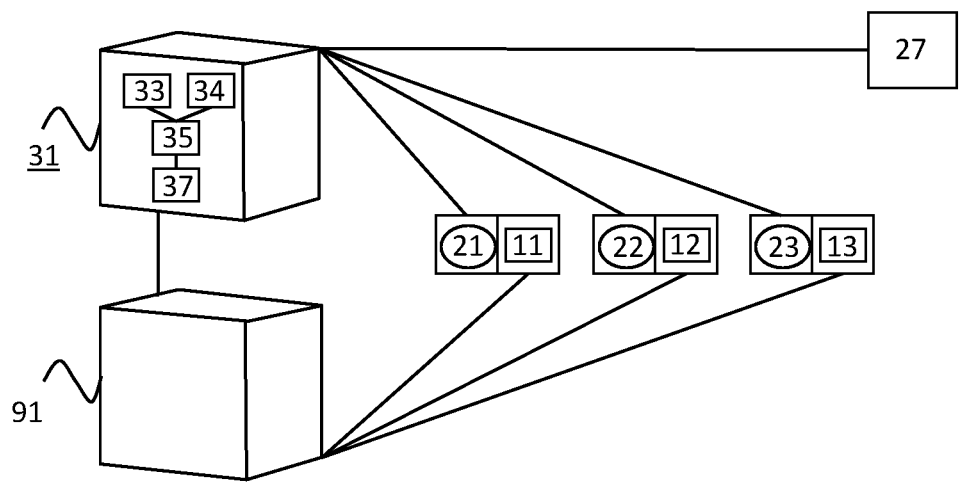
FIG. 5 is a block diagram of a second embodiment of the system.

FIG. 5 shows a second embodiment of the controller for controlling an environmental control system in a plant growing environment: a climate control computer 31. In the example of FIG. 5, the climate (temperature, humidity, CO2 level) is controlled by the climate control computer 31 and the light conditions (light intensity, spectrum, and their dependence on the time of day and growth stage of the plant) are controlled by a light control computer 91. The light computer 91 controls lighting devices 11-13, e.g. LED modules. The climate computer 31 controls the Heating, Ventilation and Air Conditioning (HVAC) system 27.

The climate control computer 31 comprises a receiver 33, a transmitter 34, a processor 35, and memory 37. The processor 35 is configured to select a grow protocol from a collection of grow protocols stored in memory 37, select a container identifier identifying a container (which comprises at least one plant) from a plurality of container identifiers or a plant identifier from a plurality of plant identifiers, and associate the grow protocol with the container or plant identifier. In an alternative embodiment, the collection of grow protocols is stored on an Internet server (not shown in FIG. 5).

In the example of FIG. 5, the grow protocol contains target values for a plurality of growth condition parameters. These plurality of growth condition parameters includes a first growth condition parameter and one or more other growth condition parameters. The first growth condition parameter represents one of temperature, CO2 level and/or humidity. The grow protocol further comprises at least a target value that represents a light setting. The plurality of container or plant identifiers is stored in the memory 37.

The processor 35 is further configured to determine an adjusted target value by applying an adjustment to a first target value of the one or more target values for the first growth condition parameter of the one or more growth condition parameters and control, via the transmitter 35, the HVAC system 27 based on the adjusted target value and the light control computer 91 (and thereby at least one of the lighting devices 11-13) based on the target light setting. The adjustment to the first target value is larger than a predetermined minimum and smaller than a predetermined maximum. The target light setting is not adjusted.

The processor 35 is further configured to obtain, via the receiver 33, measurement information associated with the container or plant identifier from at least one of the sensor devices 21-23, determine a measured plant growth parameter value based on the measurement information and compare the measured plant growth parameter value with an expected plant growth parameter value. The expected plant growth parameter value is included in the grow protocol.

The processor 35 is further configured to determine a merit related to a difference between the measured plant growth parameter value and the expected plant growth parameter value, replace, in the grow protocol, the target value with the adjusted target value in dependence on the merit exceeding a threshold, and replacing, in the grow protocol, the expected plant growth parameter value with the measured plant growth parameter value in dependence on the merit exceeding the threshold.

The climate control computer 31 may additionally receive sensor data from one or more climate sensors (not shown), e.g. including a temperature sensor and/or a CO2 sensor, and control the HVAC system 27 based on this sensor data to achieve a target temperature or CO2 value.

In the embodiment of the computer 31 shown in FIG. 5, the computer 31 comprises one processor 35. In an alternative embodiment, the computer 31 comprises multiple processors. The processor 35 may be a general-purpose processor, e.g. from Intel or AMD, or an application-specific processor. The processor 35 may run a Windows or Unix-based operating system for example. The memory 37 may comprise one or more memory units. The memory 37 may comprise one or more hard disks and/or solid-state memory, for example. The memory 37 may be used to store an operating system, applications and application data, for example.

The receiver 33 and the transmitter 34 may use one or more wired and/or wireless communication technologies to communicate with the HVAC system 27 and the sensor devices 21-23, for example. In an alternative embodiment, multiple receivers and/or multiple transmitters are used in computer 31 instead of a single receiver and a single transmitter. In the embodiment shown in FIG. 5, separate receivers and separate transmitters are used. In an alternative embodiment, the receiver 33 and the transmitter 34 are combined into a transceiver. The computer 31 may comprise other components typical for a computer such as a power connector and a display. The invention may be implemented using a computer program running on one or more processors.

In the embodiment of FIG. 5, the computer 31 uses a transmitter to control HVAC system 27. In an alternative embodiment, the computer 31 uses only analog wires to control HVAC system 27.

Figure 6:
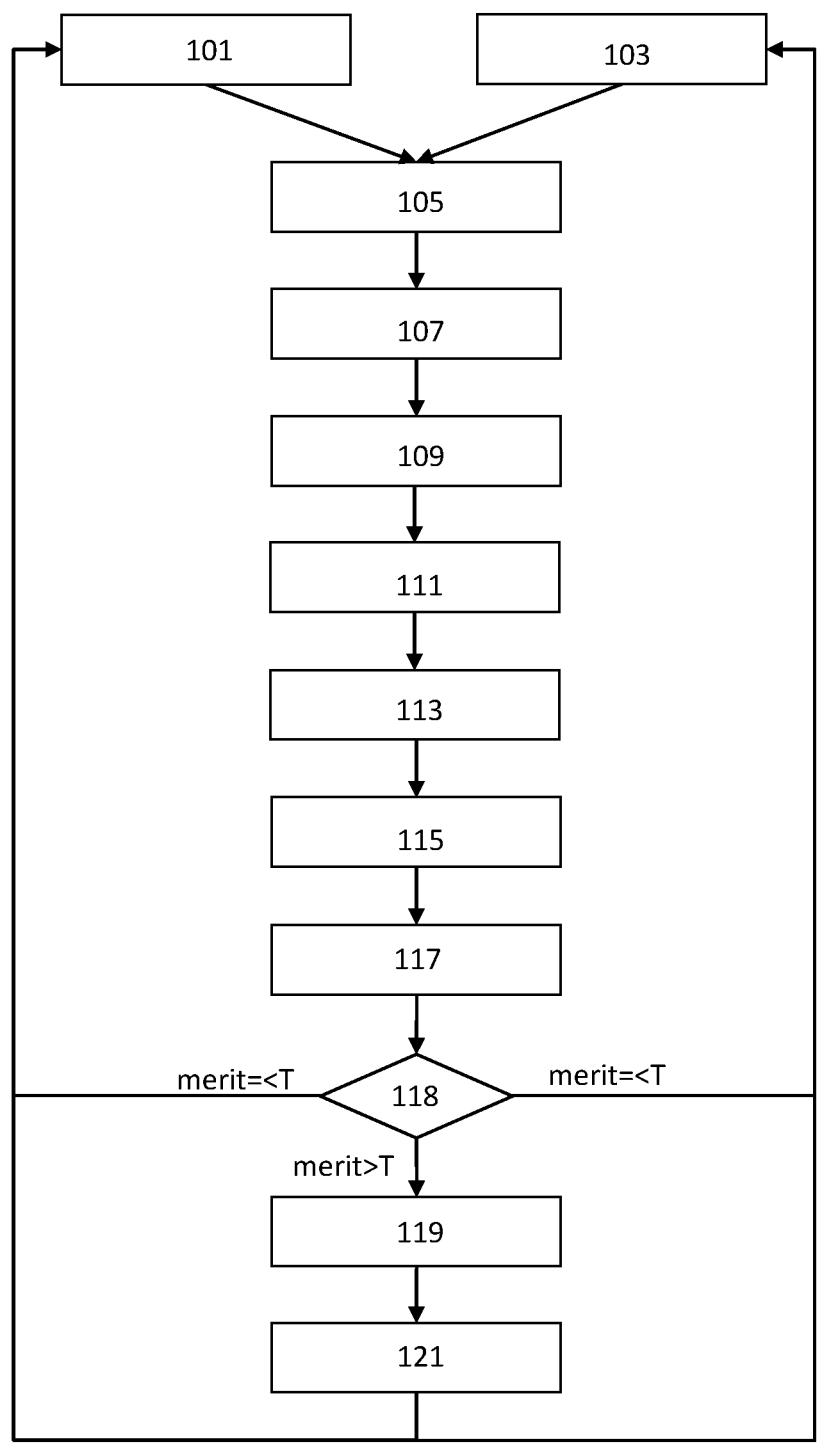
FIG. 6 is a flow diagram of a first embodiment of the method.

A first embodiment of the method of controlling an environmental control system in a plant growing environment is shown in FIG. 6. A step 101 comprises selecting a grow protocol from a collection of grow protocols stored in a memory. A step 103 comprises selecting a container identifier identifying a container from a plurality of container identifiers or a plant identifier from a plurality of plant identifiers. The container comprises at least one plant and the plurality of container or plant identifiers is stored in the memory or in a further memory.

A step 105 comprises associating the grow protocol selected in step 101 with the container or plant identifier selected in step 103. The grow protocol comprises one or more target values for one or more growth condition parameters. A step 107 comprises determining an adjusted target value by applying an adjustment to a target value of the one or more target values for a first growth condition parameter of the one or more growth condition parameters. The adjustment is larger than a predetermined minimum and smaller than a predetermined maximum.

A step 109 comprises controlling an environmental control system based on the adjusted target value determined in step 107. A step 111 comprises obtaining measurement information associated with the container or plant identifier selected in step 103 from at least one device. A step 113 comprises determining a measured plant growth parameter value based on the measurement information obtained in step 111. A step 115 comprises comparing the measured plant growth parameter value determined in step 113 with an expected plant growth parameter value. The expected plant growth parameter value is included in the grow protocol selected in step 101.

A step 117 comprises determining a merit related to a difference between the measured plant growth parameter value and the expected plant growth parameter value. A step 118 comprises comparing the merit determined in step 117 with a threshold T. If it is determined in step 118 that the merit exceeds the threshold T, a step 119 is performed next. Step 119 comprises replacing, in the grow protocol, the target value with the adjusted target value. A step 121 comprises replacing, in the grow protocol, the expected plant growth parameter value with the measured plant growth parameter value If it is determined in step 118 that the merit does not exceed the threshold T, step 103 or steps 101 and 103 are repeated after step 121, after which the method proceeds as shown in FIG. 6. Step 103 or steps 101 and 103 are also repeated after step 121, after which the method proceeds as shown in FIG. 6.

In the next iteration of steps 103 to 121, a further container or plant identifier is selected, a further adjusted target value is determined by applying a further adjustment to a target value (e.g. to the adjusted target value stored in step 119 of a previous iteration), the environmental control system or a further environment control system is controlled based on the further adjusted target value, further measurement information associated with the further container or plant identifier is obtained, a further measured plant growth parameter value is determined and compared with the expected growth parameter value (e.g. with the measured plant growth parameter value stored in a previous iteration of step 121), a further (adjustment) merit is determined and if the further merit exceeds the threshold, the target value is replaced with the further adjusted target value and the expected growth parameter value is replaced with the further measured growth parameter value.

Figure 7:
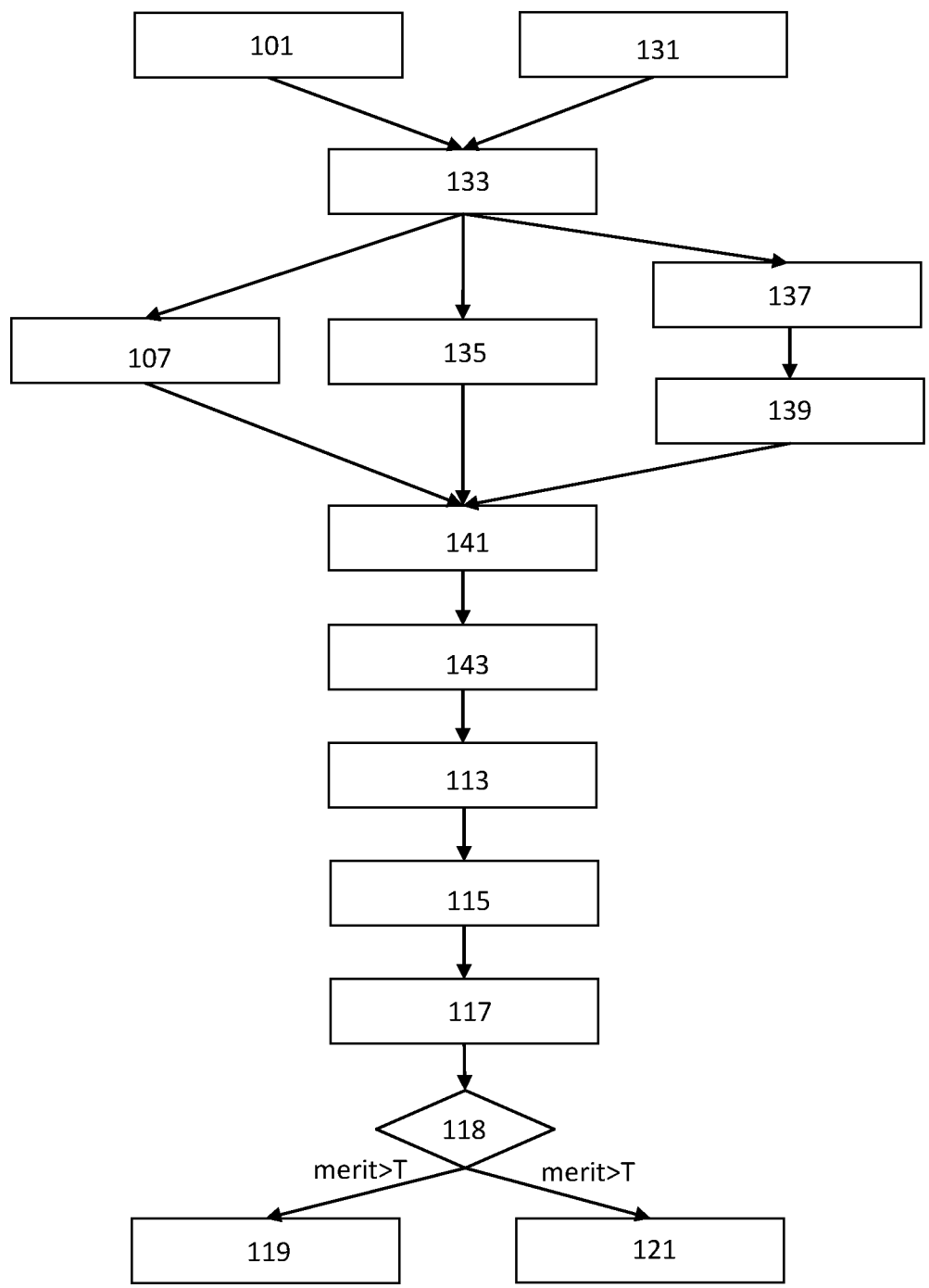
FIG. 7 is a flow diagram of a second embodiment of the method.

A second embodiment of the method of controlling an environmental control system in a plant growing environment is shown in FIG. 7. In the example of FIG. 2, it was described that a plant container was inserted into a growth layer and a grow protocol was associated with this container. It was also described that the next container inserted into the same growth layer could be associated with a different grow protocol. Since a container is not shielded from the light generated by the lighting modules above a neighboring container, crosstalk of the different light protocols for adjacent containers might occur. This problem is addressed by this second embodiment.

In the embodiment of FIG. 7, the environmental control system comprises a plurality of lighting devices. Step 101 comprises selecting a grow protocol from a collection of grow protocols stored in a memory. The grow protocol comprises one or more target values for one or more growth condition parameters. A step 131 comprises selecting a container identifier identifying a container from a plurality of container identifiers. The container comprises at least one plant and the plurality of container identifiers are stored in the memory or in a further memory. A step 133 comprises associating the grow protocol selected in step 101 with the container identifier selected in step 131.

Step 107, a step 135 and a step 137 are performed after step 133. Step 107 comprises determining an adjusted target value by applying an adjustment to a target value of the one or more target values (comprised in the grow protocol selected in step 101) for a first growth condition parameter of the one or more growth condition parameters. In the embodiment of FIG. 7, the target value of the first growth condition parameter represents a light setting. The adjustment is larger than a predetermined minimum and smaller than a predetermined maximum.

Step 135 comprises selecting a lighting device associated with the container identifier selected in step 131 from the plurality of lighting devices. Step 137 comprises determining a crosstalk-free region of a container which corresponds to the container identifier selected in step 131. The crosstalk-free region is determined based on user input or based on distances between the plurality of lighting devices and plants growing in the container and/or on patterns of light emitted by the plurality of lighting devices. Plants growing in the crosstalk-free region are free of light crosstalk. For example, the center region of a container is typically free of light cross talk. A step 139 comprises determining one or more plant identifiers which correspond to one or more plants growing in the crosstalk-free region of the container, as determined in step 137. Step 139 may comprise selecting plant identifiers 63, 64 and 65 of FIG. 4, for example.

Step 141 comprises controlling the lighting device selected in step 135 based on the adjusted target value determined in step 107. Step 143 comprises obtaining measurement information associated with the with the one or more plant identifiers determined in step 139 from at least one device. Step 113 comprises determining a measured plant growth parameter value based on the measurement information obtained in step 143. Step 115 comprises comparing the measured plant growth parameter value determined in step 133 with an expected plant growth parameter value. The expected plant growth parameter value is included in the grow protocol selected in step 101.

Step 117 comprises determining a merit related to a difference between the measured plant growth parameter value and the expected plant growth parameter value. Step 118 comprises comparing this (adjustment) merit with a threshold T. If it is determined in step 118 that the merit exceeds the threshold T, step 119 is performed next. Step 119 comprises replacing, in the grow protocol, the target value with the adjusted target value. Step 121 comprises replacing, in the grow protocol, the expected plant growth parameter value with the measured plant growth parameter value Thus, in the embodiment of FIG. 7, light crosstalk is avoided by only including the plants that do not suffer from this crosstalk. For example, a light protocol is associated with three adjacent containers in the growth layer and measurement information is only obtained for the plants in the middle of the three containers (assuming they do not suffer from crosstalk). Alternatively, if the next container inserted into the same growth layer is associated with a different grow protocol, measurement information may be obtained for the plants in the center of the container, as described in relation to FIG. 4.

Figure 8:
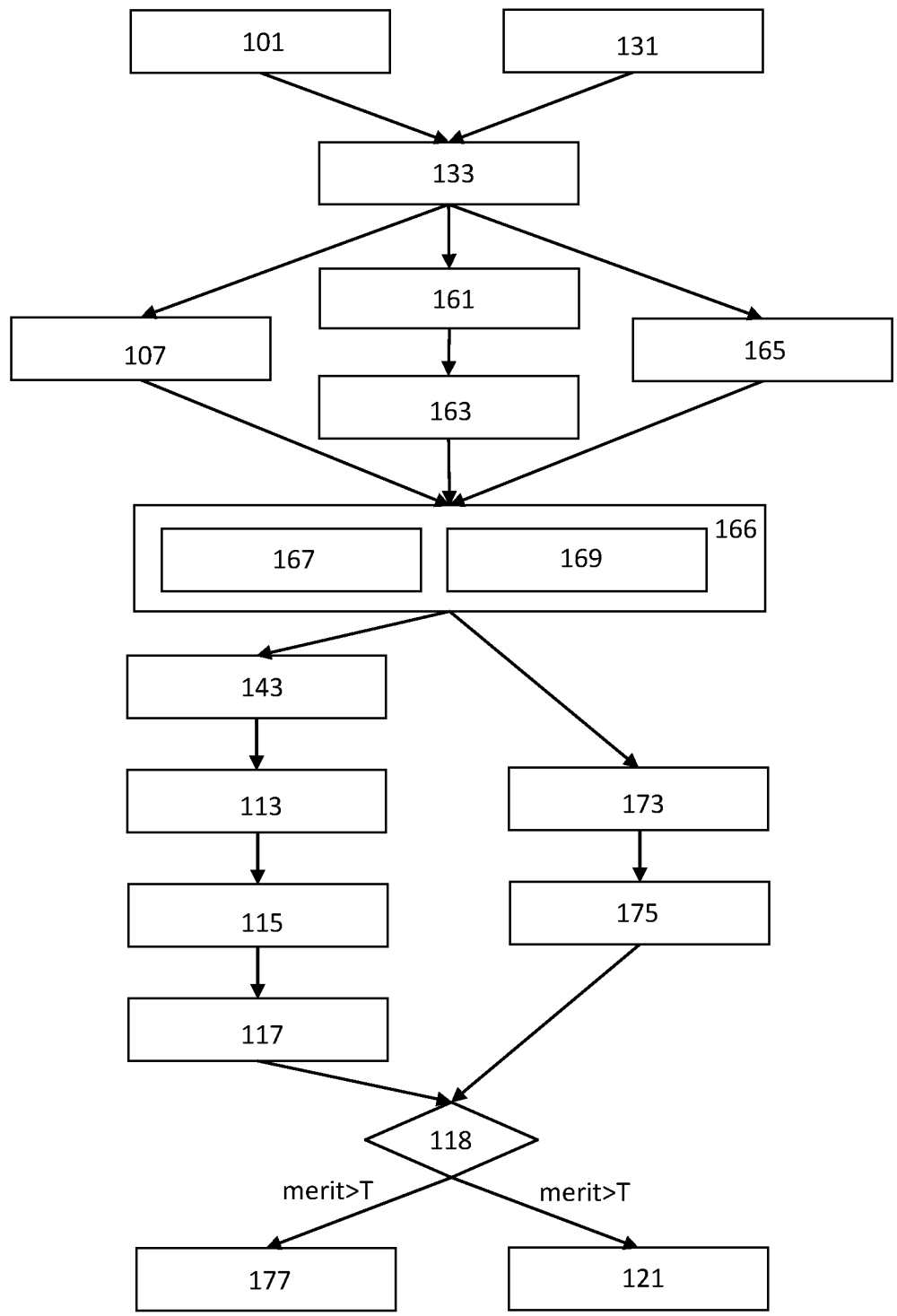
FIG. 8 is a flow diagram of a third embodiment of the method.

A third embodiment of the method of controlling an environmental control system in a plant growing environment is shown in FIG. 8. In the embodiment of FIG. 8, the environmental control system comprises a plurality of lighting devices and a further environmental control system is controlled as well. Step 101 comprises selecting a grow protocol from a collection of grow protocols stored in a memory. The grow protocol comprises target values for a plurality of growth condition parameters. The plurality of growth condition parameters include a first growth condition parameter and one or more other growth condition parameters.

Step 131 comprises selecting a container identifier identifying a container from a plurality of container identifiers. The container comprises at least one plant and the plurality of container identifiers is stored in the memory or in a further memory. Step 133 comprises associating the grow protocol selected in step 101 with the container identifier selected in step 131. Step 107, a step 161 and a step 165 are performed after step 133.

Step 107 comprises determining an adjusted target value by applying an adjustment to a target value of the one or more target values for the first growth condition parameter. The target value of the first growth condition parameter represents a light setting. The adjustment is larger than a predetermined minimum and smaller than a predetermined maximum. A step 165 comprises determining one or more further target values for the one or more other growth condition parameters, e.g. temperature. These one or more further target values are not adjusted.

Step 161 comprises determining a current location of the container identifier selected in step 133. A step 163 comprises selecting a lighting device associated with the current location of the container identifier, as determined in step 161, from the plurality of lighting devices. A step 166 is performed after steps 107, 163 and 165 have completed.

Step 166 comprises two sub steps: a step 167 and a step 169. Step 167 comprises controlling the lighting device selected in step 163 based on the adjusted target value. Step 169 comprises controlling a further environmental control system, e.g. climate control computer 25 and thereby HVAC system 27 of FIG. 1, based on one or more further target values determined in step 165 (without adjustment). Steps 167 and 169 are performed in parallel.

Step 143 and a step 173 are performed after step 166. Step 143 comprises obtaining measurement information associated with the container identifier from at least one device. Step 113 comprises determining a measured plant growth parameter value based on the measurement information obtained in step 143. Step 115 comprises comparing the measured plant growth parameter value determined in step 113 with an expected plant growth parameter value. The expected plant growth parameter value is included in the grow protocol selected in step 101. Step 117 comprises determining a merit related to a difference between the measured plant growth parameter value and the expected plant growth parameter value, also referred to as a merit of the adjustment or the adjustment merit.

Step 173 comprises determining light characteristics of light received at the location of the container identifier (e.g. by a light/color sensor) from a further lighting device of the plurality of lighting devices. This further lighting device may cause light crosstalk. Step 175 comprises determining a compensated target value based on the adjusted target value determined in step 107 and the light characteristics determined in step 173.

Step 118 comprises comparing the (adjustment) merit determined in step 117 with a threshold T. If it is determined in step 118 that the merit exceeds the threshold T, step 177 is performed next. Step 177 comprises replacing, in the grow protocol, the target value with the compensated target value determined in step 175. Step 121 comprises replacing, in the grow protocol, the expected plant growth parameter value with the measured plant growth parameter value determined in step 113.

Figure 9:
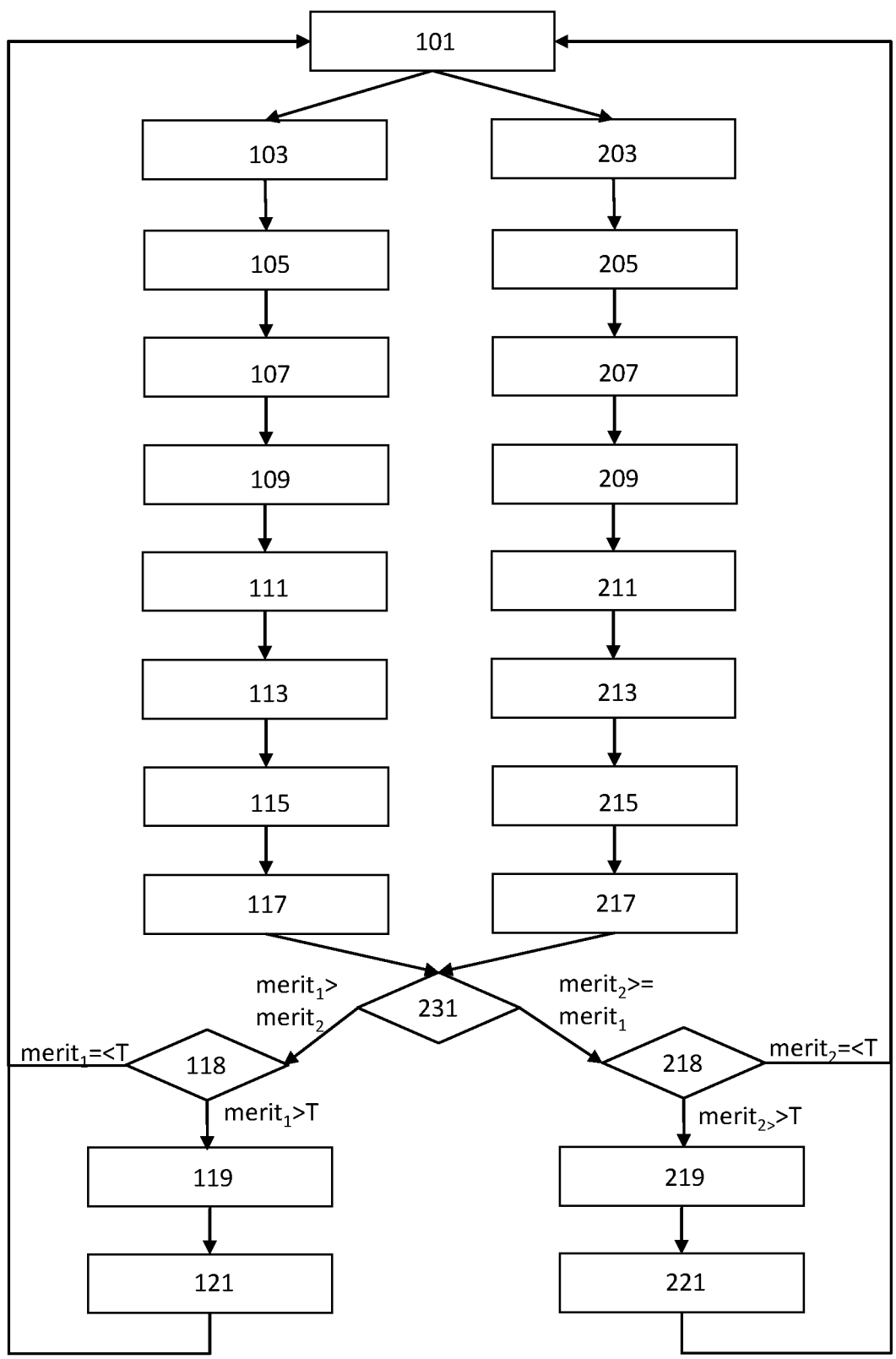
FIG. 9 is a flow diagram of a fourth embodiment of the method.

A fourth embodiment of the method of controlling an environmental control system in a plant growing environment is shown in FIG. 9. This fourth embodiment is a variant on the first embodiment of FIG. 6. In the embodiment of FIG. 9, step 103 and a step 203 are performed after the grow protocol has been selected in step 101. Step 203 comprises selecting a further container identifier identifying a further container from the plurality of container identifiers or a further plant identifier from the plurality of plant identifiers.

The further container comprises at least one plant. In an alternative embodiment, steps 101, 103 and 203 are performed in parallel.

Next, a step 205 comprises associating the grow protocol selected in step 101 with the further container identifier selected in step 203. A step 207 comprises determining a further adjusted target value by applying a further adjustment to a further target value of the one or more target values comprised in the grow protocol. The further target value may be a target value for the same growth condition parameter as the adjusted target value determined in step 107 or for a different growth condition parameter. In the former case, the further adjustment is different than the adjustment determined in step 107. The further adjustment is larger than the predetermined minimum and smaller than the predetermined maximum.

A step 209 comprises controlling the environmental control system or a different environmental control system based on the further adjusted target value determined in step 207. A step 211 comprises obtaining further measurement information associated with the further container identifier selected in step 203 from one or more devices. A step 213 comprises determining a further measured plant growth parameter value based on the further measurement information obtained in step 211. A step 215 comprises comparing the further measured plant growth parameter determined in step 213 value with the expected plant growth parameter value (which is also used in step 115). A step 217 comprises determining a further merit of a difference between the further measured plant growth parameter value and the expected plant growth parameter value.

A step 231 is performed after steps 117 and steps 217 have completed. Step 231 comprises comparing the (adjustment) merit determined in step 117 with the further (adjustment) merit determined in step 217. If the merit exceeds the further merit, step 118 is performed. Step 118 comprises comparing the merit with a threshold T. If it is determined in step 118 that the merit exceeds the threshold T, a step 119 is performed next. Step 119 comprises replacing, in the grow protocol, the target value with the adjusted target value determined in step 107. Step 121 comprises replacing, in the grow protocol, the expected plant growth parameter value with the measured plant growth parameter value determined in step 113.

If the merit does not exceed the further merit, step 218 is performed. Step 218 comprises comparing the further merit with a threshold T. If it is determined in step 218 that the further merit exceeds the threshold T, a step 219 is performed next. Step 219 comprises replacing, in the grow protocol, the target value with the further adjusted target value determined in step 207. A step 121 comprises replacing, in the grow protocol, the expected plant growth parameter value with the further measured plant growth parameter value determined in step 213. Step 101 is repeated after step 121 or step 221 have completed and the method proceeds as shown in FIG. 9.

Figure 10:
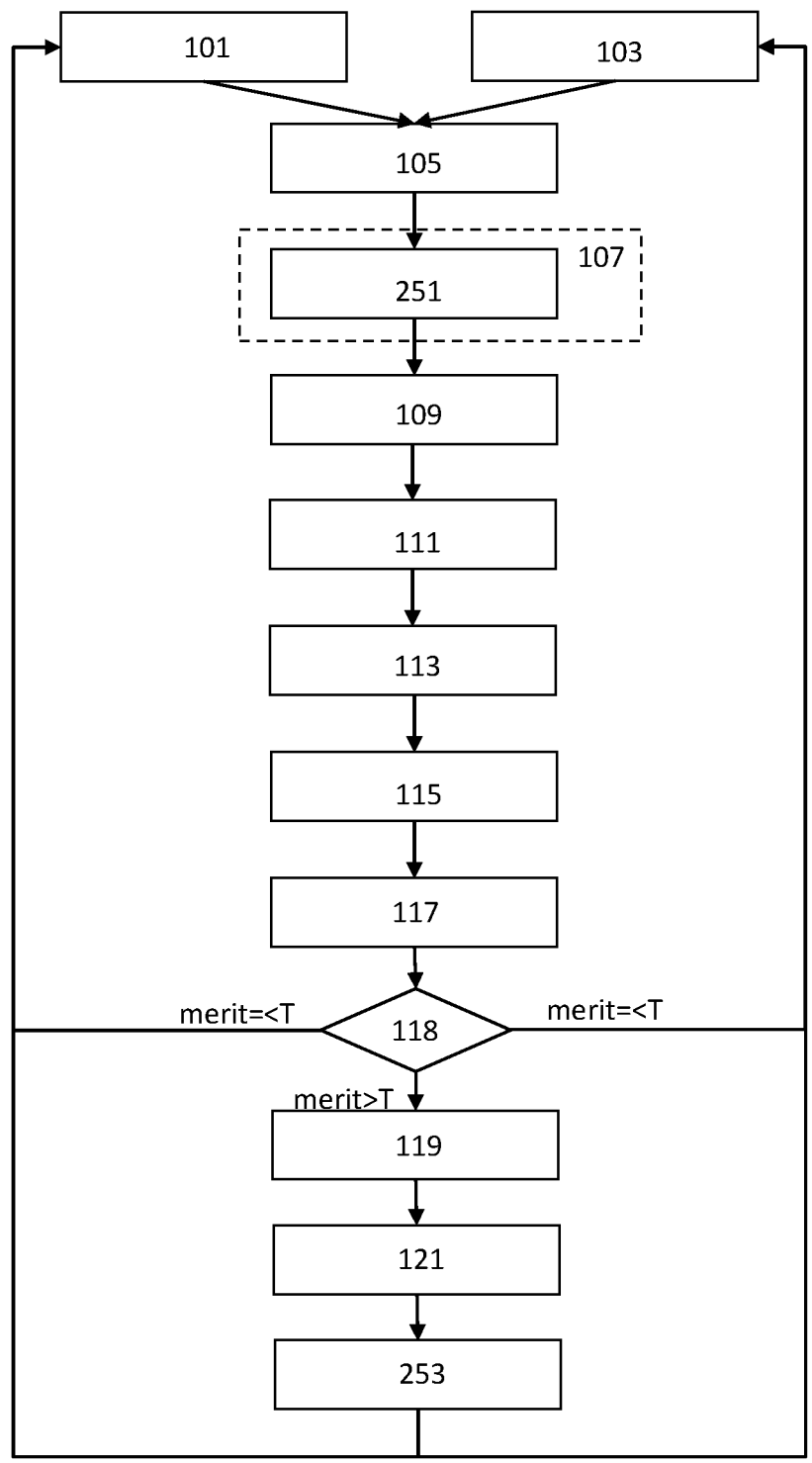
FIG. 10 is a flow diagram of a fifth embodiment of the method.

A fifth embodiment of the method of controlling an environmental control system in a plant growing environment is shown in FIG. 10. This fourth embodiment is an extension of the first embodiment of FIG. 6. In the embodiment of FIG. 10, step 107 of FIG. 6 is implemented by a step 251 and a step 253 is performed after step 121. Step 251 comprises determining the adjusted target value based on a growth model of a plant species or variety associated with the grow protocol. Step 253 comprises modifying the growth model based on a relation between the adjusted target value and the measured plant growth parameter value.

The embodiments of FIGS. 6 to 10 show various aspects of the invention. In alternative embodiments, multiple of these aspects are combined.

Figure 11:
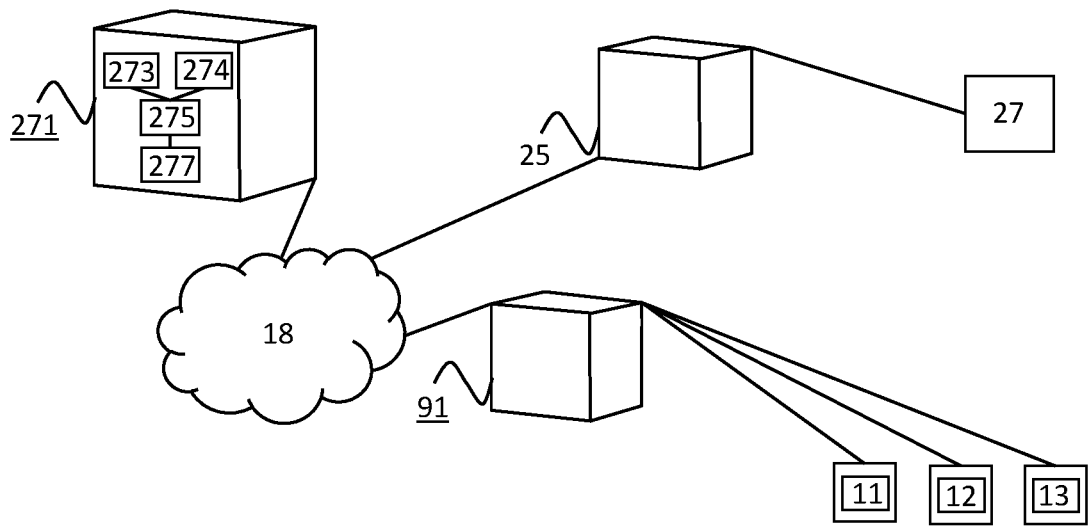
FIG. 11 is a block diagram of a third embodiment of the system.

FIG. 11 shows a third embodiment of the controller for controlling an environmental control system in a plant growing environment: an Internet server 271. In the example of FIG. 11, the climate (temperature, humidity, CO2 level) is controlled by the climate control computer 25 and the light conditions (light intensity, spectrum, and their dependence on the time of day and growth stage of the plant) are controlled by a light control computer 91. The light computer 91 controls lighting devices 11-13, e.g. LED modules. The climate computer 25 controls the Heating, Ventilation and Air Conditioning (HVAC) system 27.

The Internet server 271 comprises a receiver 273, a transmitter 274, a processor 275, and memory 277. The processor 275 is configured to select a grow protocol from a collection of grow protocols stored in memory 277, select a container identifier identifying a container (which comprises at least one plant) from a plurality of container identifiers or a plant identifier from a plurality of plant identifiers, and associate the grow protocol with the container or plant identifier.

The plurality of container or plant identifiers is also stored in the memory 277. In the example of FIG. 11, the grow protocol comprises target values for a plurality of growth condition parameters. These plurality of growth condition parameters may include, for example, light condition, temperature, CO2 level and/or humidity.

The processor 275 is further configured to determine an adjusted target value by applying an adjustment to a first target value of the one or more target values for a first one of the one or more growth condition parameters. The adjustment to the first target value is larger than a predetermined minimum and smaller than a predetermined maximum. The target values for the other growth condition parameters are not adjusted.

The processor 275 is further configured to control, via the transmitter 274, the climate control computer 25 (and thereby the HVAC system 27) and the light control computer 91 (and thereby at least one of the lighting devices 11-13) based on the adjusted target value and the unadjusted other target values.

The processor 275 is further configured to obtain, via the receiver 273, measurement information associated with the container or plant identifier, determine a measured plant growth parameter value based on the measurement information and compare the measured plant growth parameter value with an expected plant growth parameter value. The expected plant growth parameter value is included in the grow protocol. The measurement information may be obtained from a user device of the grower or from an automated weighing system coupled to an ERP system of the grower, for example.

The processor 275 is further configured to determine a merit related to a difference between the measured plant growth parameter value and the expected plant growth parameter value, replace, in the grow protocol, the target value with the adjusted target value in dependence on the merit exceeding a threshold, and replacing, in the grow protocol, the expected plant growth parameter value with the measured plant growth parameter value in dependence on the merit exceeding the threshold.

In the example of FIG. 11, the Internet server 271 is shown controlling a single light control computer 91 and a single climate control computer 25. However, the advantage of using a central computer is that it allows the adjustments to be scheduled over different locations, e.g. within a vertical farm or between different farms. The Internet server 271 may schedule different experiments at different locations in parallel or in sequence and may perform the methods of FIGS. 6 to 9 or a combination therefore, for example.

As an example, a grower may own multiple vertical farms, each having at least one climate cell, with each climate cell having at least one growth rack, and with each growth rack having at least one growth layer. In this example, the grower is growing a certain crop and variety in these vertical farms and following a nominal grow protocol and a certain time and logistics schedule. The grower may then be offered, via a user interface, the option to choose from the following:

A list of available objectives (e.g. the objective to maximize the growth efficiency). Alternatively, the user may be able to define an objective via an objective editor. It may also be possible for the grower to select multiple objectives, or define restrictions, for instance, to maximize produced biomass while keeping energy per kg produced biomass below a certain maximum limit.

For the objective chosen, a list of growth condition parameters that may be varied and that are relevant for achieving this objective (e.g. temperature, which can be varied in vertical farm 1 and growth cell 1 between 22 and 25° C. and in growth cell 2 between 20 and 30° C., for example).

In dependence on the choices made, the Internet server 271 interfaces with the light control computer 91 and the climate control computer 25, selects a plant container in a growth layer in a growth rack in a growth cell in the vertical farm, and instructs the light control computer 91 or the climate control computer 25 to use an adjusted target value (e.g. a deviation in temperature) for this container. In an alternative embodiment, the Internet server 271 may interface with a central control system of the vertical farm(s), which then interfaces with other local systems (e.g. including a logistics system, a light control computer, a climate control computer, and possibly an ERP system).

At harvest of this container, measured plant parameters of harvested plants are retrieved. Alternatively, plant parameters may be measured and retrieved while the plants are still residing in the growth layer or when they are taken from the growth layer for the purpose of respacing or relocation. The harvest information is then processed, together with all available information on similar grow protocols (or grow protocols for similar plants or similar plant varieties) executed in the past or ongoing and their outcome, to suggest an improved adjustment to the nominal growth recipe. This may be repeated several times or even continuously.

In the embodiment of the server 271 shown in FIG. 11, the server 271 comprises one processor 275. In an alternative embodiment, the server 271 comprises multiple processors. The processor 275 may be a general-purpose processor, e.g. from Intel or AMD, or an application-specific processor. The processor 275 may run a Windows or Unix-based operating system for example. The memory 277 may comprise one or more memory units. The memory 277 may comprise one or more hard disks and/or solid-state memory, for example. The memory 277 may be used to store an operating system, applications and application data, for example.

The receiver 273 and the transmitter 274 may use one or more wired and/or wireless communication technologies to communicate with the light control computer 91 and the climate control computer 25, for example. In an alternative embodiment, multiple receivers and/or multiple transmitters are used in server 271 instead of a single receiver and a single transmitter. In the embodiment shown in FIG. 11, separate receivers and separate transmitters are used. In an alternative embodiment, the receiver 273 and the transmitter 274 are combined into a transceiver. The server 271 may comprise other components typical for a server such as a power connector and a display. The invention may be implemented using a server program running on one or more processors.

Figure 12:
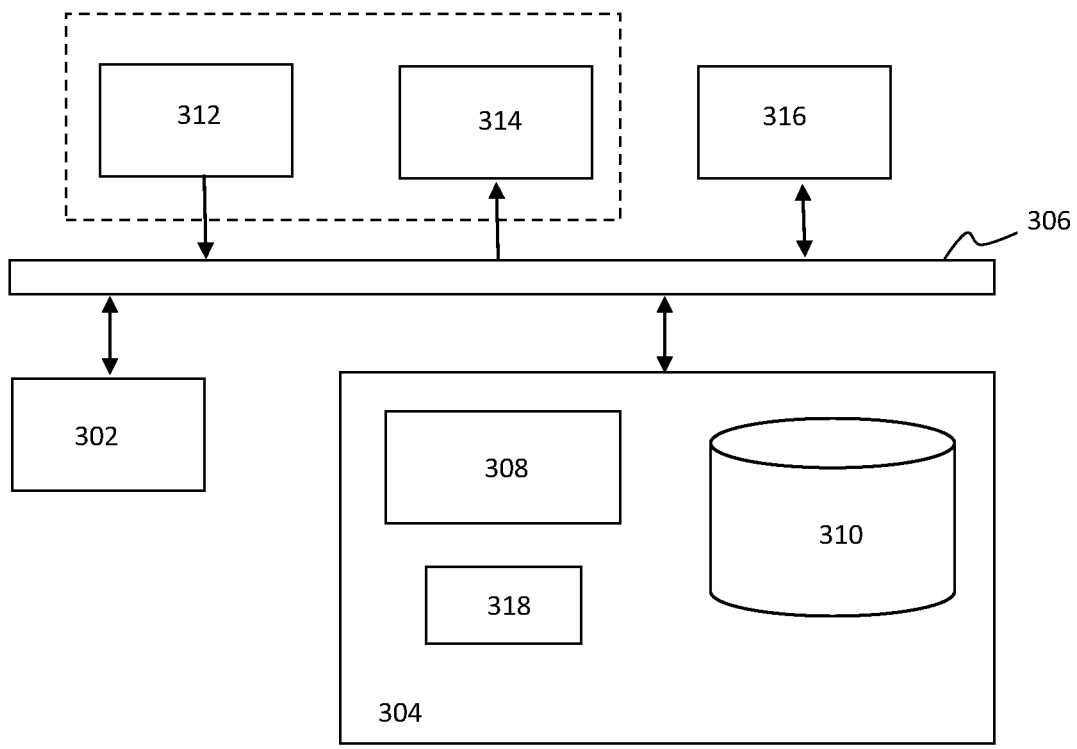
FIG. 12 is a block diagram of an exemplary data processing system for performing the method of the invention.

FIG. 12 depicts a block diagram illustrating an exemplary data processing system that may perform the method as described with reference to FIGS. 6 to 10.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 12) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated

The invention claimed is:

1. A method of controlling an environmental control system in a controllable plant growing environment, said method comprising;
    selecting a grow protocol from a collection of grow protocols stored in a memory;
    selecting a container identifier identifying a container from a plurality of container identifiers, said container comprising at least one plant located in the controllable plant growing environment and said plurality of container identifiers being stored in said memory or in a further memory;
    associating said grow protocol with said container identifier, said grow protocol comprising one or more target values for one or more growth condition parameters;
    determining an adjusted target value by applying an adjustment to a target value of said one or more target values for a first growth condition parameter of said one or more growth condition parameters, said adjustment being larger than a predetermined minimum and smaller than a predetermined maximum;
    controlling an environmental control system in the controllable plant growing environment based on said adjusted target value;
    determining a crosstalk-free region of a container which corresponds to said container identifier, plants growing in said crosstalk-free region being free of crosstalk;
    determining one or more plant identifiers which correspond to one or more plants growing in said crosstalk-free region of said container;
    obtaining measurement information associated with said container identifier by obtaining measurement information associated with said one or more plant identifiers from at least one device;
    determining a measured plant growth parameter value based on said measurement information;
    comparing said measured plant growth parameter value with an expected plant growth parameter value, said expected plant growth parameter value being included in said grow protocol;
    determining a merit related to a difference between said measured plant growth parameter value and said expected plant growth parameter value;
    replacing, in said grow protocol, said target value with said adjusted target value in dependence on said merit exceeding a threshold; and
    replacing, in said grow protocol, said expected plant growth parameter value with said measured plant growth parameter value in dependence on said merit exceeding said threshold.

2. The method as claimed in claim 1, wherein said target value of said first growth condition parameter represents a light setting, said environmental control system comprises a plurality of lighting devices, and said method comprises:
    selecting a lighting device associated with said container identifier from said plurality of lighting devices; and
    controlling said lighting device based on said adjusted target value.

3. The method as claimed in claim 1, wherein said target value of said first growth condition parameter represents a light setting, said environmental control system comprises a plurality of lighting devices, and said method comprises:
    determining a current location of a container identifier;
    selecting said lighting device from said plurality of lighting devices by selecting a lighting device associated with said current location of said container identifier; and controlling said lighting device based on said adjusted target value.

4. The method as claimed in claim 2, wherein:

said crosstalk-free region is free of light crosstalk, said crosstalk-free region being determined based on user input or based on distances between said plurality of lighting devices and plants growing in said container and/or on patterns of light emitted by said plurality of lighting devices.

5. The method as claimed in claim 2, wherein said method comprises:

determining light characteristics of light received at the location of said container identifier from a further lighting device of said plurality of lighting devices;

determining a compensated target value based on said adjusted target value and said light characteristics; and replacing, in said grow protocol, said target value with said compensated target value in dependence on said merit exceeding said threshold.

6. The method as claimed in claim 1, wherein said grow protocol comprises target values for a plurality of growth condition parameters, said plurality of growth condition parameters including said first growth condition parameter and one or more other growth condition parameters, and said method comprises controlling said environmental control system or a further environmental control system based on one or more target values specified for said one or more other growth condition parameters without adjustment while controlling said environmental control system based on said adjusted target value for said first growth condition parameter.

7. The method as claimed in claim 1, wherein said method comprises:

associating said grow protocol with a further container identifier;

determining a further adjusted target value by applying a further adjustment to a further target value of said one or more target values, said further adjustment being larger than said predetermined minimum and smaller than said predetermined maximum;

controlling said environmental control system or a different environmental control system based on said further adjusted target value;

obtaining further measurement information associated with said further container identifier from one or more devices;

determining a further measured plant growth parameter value based on said further measurement information;

comparing said further measured plant growth parameter value with said expected plant growth parameter value;

determining a further merit of a difference between said further measured plant growth parameter value and said expected plant growth parameter value;

replacing, in said grow protocol, said further target value with said further adjusted target value in dependence on said further merit exceeding said threshold; and replacing, in said grow protocol, said expected plant growth parameter value with said further measured plant growth parameter value in dependence on said further merit exceeding said threshold.

8. The method as claimed in claim 1, wherein said method comprises:

associating said grow protocol with a further container identifier;

determining a further adjusted target value by applying a further adjustment to a further target value of said one or more target values, said further adjustment being larger than said predetermined minimum and smaller than said predetermined maximum;

controlling said environmental control system or a different environmental control system based on said further adjusted target value;

obtaining further measurement information associated with said further container identifier from one or more devices;

determining a further measured plant growth parameter value based on said further measurement information;

comparing said further measured plant growth parameter value with said expected plant growth parameter value;

determining a further merit of a difference between said further measured plant growth parameter value and said expected plant growth parameter value;

comparing said merit with said further merit;

replacing, in said grow protocol, said target value with said adjusted target value in dependence on said merit exceeding said threshold and said merit exceeding said further merit; and replacing, in said grow protocol, said expected plant growth parameter value with said measured plant growth parameter value in dependence on said merit exceeding said threshold and said merit exceeding said further merit.

9. The method as claimed in claim 1, wherein said method comprises obtaining said measurement information from said at least one device in or after a last growth stage of said grow protocol.

10. The method as claimed in claim 1, wherein said method comprises:

obtaining said measurement information from a plurality of devices; and determining said measured plant growth parameter value in a plurality of growth stages based on said measurement information.

11. The method as claimed in claim 1, wherein said method comprises determining said adjusted target value based on a growth model of a plant species or variety associated with said grow protocol.

12. The method as claimed in claim 11, wherein said method comprises modifying said growth model based on a relation between said adjusted target value and said measured plant growth parameter value.

13. A method of controlling an environmental control system in a controllable plant growing environment, said method comprising;

selecting a grow protocol from a collection of grow protocols stored in a memory;

selecting a plant identifier from a plurality of plant identifiers, said plurality of plant identifiers being stored in said memory or in a further memory, each plant identifier of said plurality of plant identifiers corresponding to a plant located in the controllable plant growing environment;

associating said grow protocol with said plant identifier, said grow protocol comprising one or more target values for one or more growth condition parameters;

determining an adjusted target value by applying an adjustment to a target value of said one or more target values for a first growth condition parameter of said one or more growth condition parameters, said adjustment being larger than a predetermined minimum and smaller than a predetermined maximum;

controlling an environmental control system in the controllable plant growing environment based on said adjusted target value;

determining a crosstalk-free region, plants growing in said crosstalk-free region being free of crosstalk;

determining one or more plant identifiers which correspond to one or more plants growing in said crosstalk-free region;

obtaining measurement information associated with said one or more plant identifier identifiers from at least one device;

determining a measured plant growth parameter value based on said measurement information;

comparing said measured plant growth parameter value with an expected plant growth parameter value, said expected plant growth parameter value being included in said grow protocol;

determining a merit related to a difference between said measured plant growth parameter value and said expected plant growth parameter value;

replacing, in said grow protocol, said target value with said adjusted target value in dependence on said merit exceeding a threshold; and replacing, in said grow protocol, said expected plant growth parameter value with said measured plant growth parameter value in dependence on said merit exceeding said threshold.

14. A controller comprising at least one sensor interface for obtaining measurement information from at least one device, at least one control interface for controlling an environmental control system in a controllable plant growing environment, and at least one processor configured to:

select a grow protocol from a collection of grow protocols stored in a memory;

select a container identifier identifying a container from a plurality of container identifiers, said container comprising at least one plant located in the controllable plant growing environment and said plurality of container identifiers being stored in said memory or in a further memory;

associate said grow protocol with said container identifier, said grow protocol comprising one or more target values for one or more growth condition parameters;

determine an adjusted target value by applying an adjustment to a target value of said one or more target values for a first growth condition parameter of said one or more growth condition parameters, said adjustment being larger than a predetermined minimum and smaller than a predetermined maximum;

control an environmental control system in the controllable plant growing environment based on said adjusted target value;

determine a crosstalk-free region of a container which corresponds to said container identifier, plants growing in said crosstalk-free region being free of crosstalk;

determine one or more plant identifiers which correspond to one or more plants growing in said crosstalk-free region of said container;

obtain measurement information associated with said container identifier by obtaining measurement information associated with said one or more plant identifiers from at least one device;

determine a measured plant growth parameter value based on said measurement information;

compare said measured plant growth parameter value with an expected plant growth parameter value, said expected plant growth parameter value being included in said grow protocol;

determine a merit related to a difference between said measured plant growth parameter value and said expected plant growth parameter value;

replace, in said grow protocol, said target value with said adjusted target value in dependence on said merit exceeding a threshold; and replace, in said grow protocol, said expected plant growth parameter value with said measured plant growth parameter value in dependence on said merit exceeding said threshold.

15. A non-transitory computer readable medium comprising instructions, the instructions when executed by at least one processor of a controller causes the at least one processor to carry out the method of claim 1.

16. The method as claimed in claim 13, wherein said target value of said first growth condition parameter represents a light setting, said environmental control system comprises a plurality of lighting devices, and said method comprises:

selecting a lighting device associated with said plant identifier from said plurality of lighting devices; and controlling said lighting device based on said adjusted target value.

17. The method as claimed in claim 13, wherein said target value of said first growth condition parameter represents a light setting, said environmental control system comprises a plurality of lighting devices, and said method comprises:

determining a current location of a plant identifier;

selecting said lighting device from said plurality of lighting devices by selecting a lighting device associated with said current location of said plant identifier; and controlling said lighting device based on said adjusted target value.

18. The method as claimed in claim 13, wherein said grow protocol comprises target values for a plurality of growth condition parameters, said plurality of growth condition parameters including said first growth condition parameter and one or more other growth condition parameters, and said method comprises controlling said environmental control system or a further environmental control system based on one or more target values specified for said one or more other growth condition parameters without adjustment while controlling said environmental control system based on said adjusted target value for said first growth condition parameter.

19. The method as claimed in claim 13, wherein said method comprises:

associating said grow protocol with a further plant identifier;

determining a further adjusted target value by applying a further adjustment to a further target value of said one or more target values, said further adjustment being larger than said predetermined minimum and smaller than said predetermined maximum;

controlling said environmental control system or a different environmental control system based on said further adjusted target value;

obtaining further measurement information associated with said further container identifier from one or more devices;

determining a further measured plant growth parameter value based on said further measurement information;

comparing said further measured plant growth parameter value with said expected plant growth parameter value;

determining a further merit of a difference between said further measured plant growth parameter value and said expected plant growth parameter value;

replacing, in said grow protocol, said further target value with said further adjusted target value in dependence on said further merit exceeding said threshold; and replacing, in said grow protocol, said expected plant growth parameter value with said further measured plant growth parameter value in dependence on said further merit exceeding said threshold.

20. The method as claimed in claim 13, wherein said method comprises:

associating said grow protocol with a further plant identifier;

determining a further adjusted target value by applying a further adjustment to a further target value of said one or more target values, said further adjustment being larger than said predetermined minimum and smaller than said predetermined maximum;

controlling said environmental control system or a different environmental control system based on said further adjusted target value;

obtaining further measurement information associated with said further container identifier from one or more devices;

determining a further measured plant growth parameter value based on said further measurement information;

comparing said further measured plant growth parameter value with said expected plant growth parameter value;

determining a further merit of a difference between said further measured plant growth parameter value and said expected plant growth parameter value;

comparing said merit with said further merit;

replacing, in said grow protocol, said target value with said adjusted target value in dependence on said merit exceeding said threshold and said merit exceeding said further merit; and replacing, in said grow protocol, said expected plant growth parameter value with said measured plant growth parameter value in dependence on said merit exceeding said threshold and said merit exceeding said further merit.

* * * * *